US012469652B2

(12) United States Patent
Sachsenhauser et al.

(10) Patent No.: US 12,469,652 B2
(45) Date of Patent: Nov. 11, 2025

(54) ON-LOAD TAP-CHANGER

(71) Applicant: Maschinenfabrik Reinhausen GmbH, Regensburg (DE)

(72) Inventors: Andreas Sachsenhauser, Mallersdorf (DE); Nikolaus Unterreiner, Regensburg (DE); Christian Muenzberg, Biburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 216 days.

(21) Appl. No.: 18/254,605

(22) PCT Filed: Dec. 2, 2021

(86) PCT No.: PCT/EP2021/083934

§ 371 (c)(1),
(2) Date: May 26, 2023

(87) PCT Pub. No.: WO2022/122535

PCT Pub. Date: Jun. 16, 2022

(65) Prior Publication Data

US 2024/0021380 A1 Jan. 18, 2024

(30) Foreign Application Priority Data

Dec. 9, 2020 (DE) ..................... 10 2020 132 772.2

(51) Int. Cl.
*H01H 9/00* (2006.01)

(52) U.S. Cl.
CPC ................................. *H01H 9/0027* (2013.01)

(58) Field of Classification Search
CPC .. H01H 9/0027; H01H 9/0016; H01H 9/0033; H01H 9/0038; H01H 9/0005; H01H 9/542; H01H 9/0011; H01F 29/04; H02K 3/04
USPC ...................................................... 200/11 TC
See application file for complete search history.

(56) References Cited

U.S. PATENT DOCUMENTS

| | | | | |
|---|---|---|---|---|
| 2,374,974 | A | 5/1945 | Blume | |
| 4,081,741 | A | 3/1978 | Palmer | |
| 8,993,904 | B2 * | 3/2015 | Elick | H01H 19/12 200/11 TC |
| 9,455,658 | B2 * | 9/2016 | Kammerl | H02P 13/06 |
| 9,607,781 | B2 * | 3/2017 | Albrecht | H01H 9/0038 |
| 10,153,101 | B2 * | 12/2018 | Kaltenborn | H01H 9/0038 |
| 10,483,879 | B2 * | 11/2019 | Bieringer | H01F 29/04 |
| 10,643,802 | B2 * | 5/2020 | Hammer | H01H 9/0016 |
| 10,692,664 | B2 * | 6/2020 | Zerr | H01F 29/04 |
| 2013/0213777 | A1 * | 8/2013 | Dohnal | H01F 29/04 200/11 TC |

FOREIGN PATENT DOCUMENTS

| | | | |
|---|---|---|---|
| DE | 659464 | C | 5/1938 |
| DE | 72826 | A1 | 5/1970 |

(Continued)

*Primary Examiner* — William A Bolton
(74) *Attorney, Agent, or Firm* — LEYDIG, VOIT & MAYER, LTD.

(57) ABSTRACT

An on-load tap-changer includes: a main path with a first connection; and an auxiliary path with a second connection. One module is configured be connected to each of the first and second connections.

12 Claims, 6 Drawing Sheets

(56) References Cited

FOREIGN PATENT DOCUMENTS

| | | | |
|---|---|---|---|
| DE | 1638555 | A1 | 12/1970 |
| DE | 3146970 | A1 | 6/1982 |
| DE | 102012107080 | B3 | 10/2013 |

* cited by examiner

ON-LOAD TAP-CHANGER

CROSS REFERENCE TO RELATED APPLICATIONS

This application is a U.S. National Phase application under 35 U.S.C. § 371 of International Application No. PCT/EP2021/083934, filed on Dec. 2, 2021, and claims benefit to German Patent Application No. DE 10 2020 132 772.2, filed on Dec. 9, 2020. The International Application was published in German on Jun. 16, 2022 as WO 2022/122535 A1 under PCT Article 21(2).

FIELD

The present disclosure relates to an on-load tap-changer for uninterrupted switching between winding taps of a tap winding.

BACKGROUND

On-load tap-changers usually have a diverter switch and a selector. The diverter switch with the vacuum interrupters and the transition resistors is arranged in a cylindrical vessel. The selector is made up of a multiplicity of bars arranged in a circle. Contacts which serve as connections for a tap winding are arranged at different levels on said bars. Two selector arms are secured to a switching pillar within the selector. These selector arms make contact with the contacts on the bars. The diverter switch and selector are connected to each other via a gear mechanism. The motor drive is arranged externally on the tap-changing transformer and is connected to the on-load tap-changer via a drive shaft. This structure requires a lot of space, is complex, and is expensive.

SUMMARY

In an embodiment, the present disclosure provides an on-load tap-changer that includes: a main path with a first connection; and an auxiliary path with a second connection. One module is configured be connected to each of the first and second connections.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
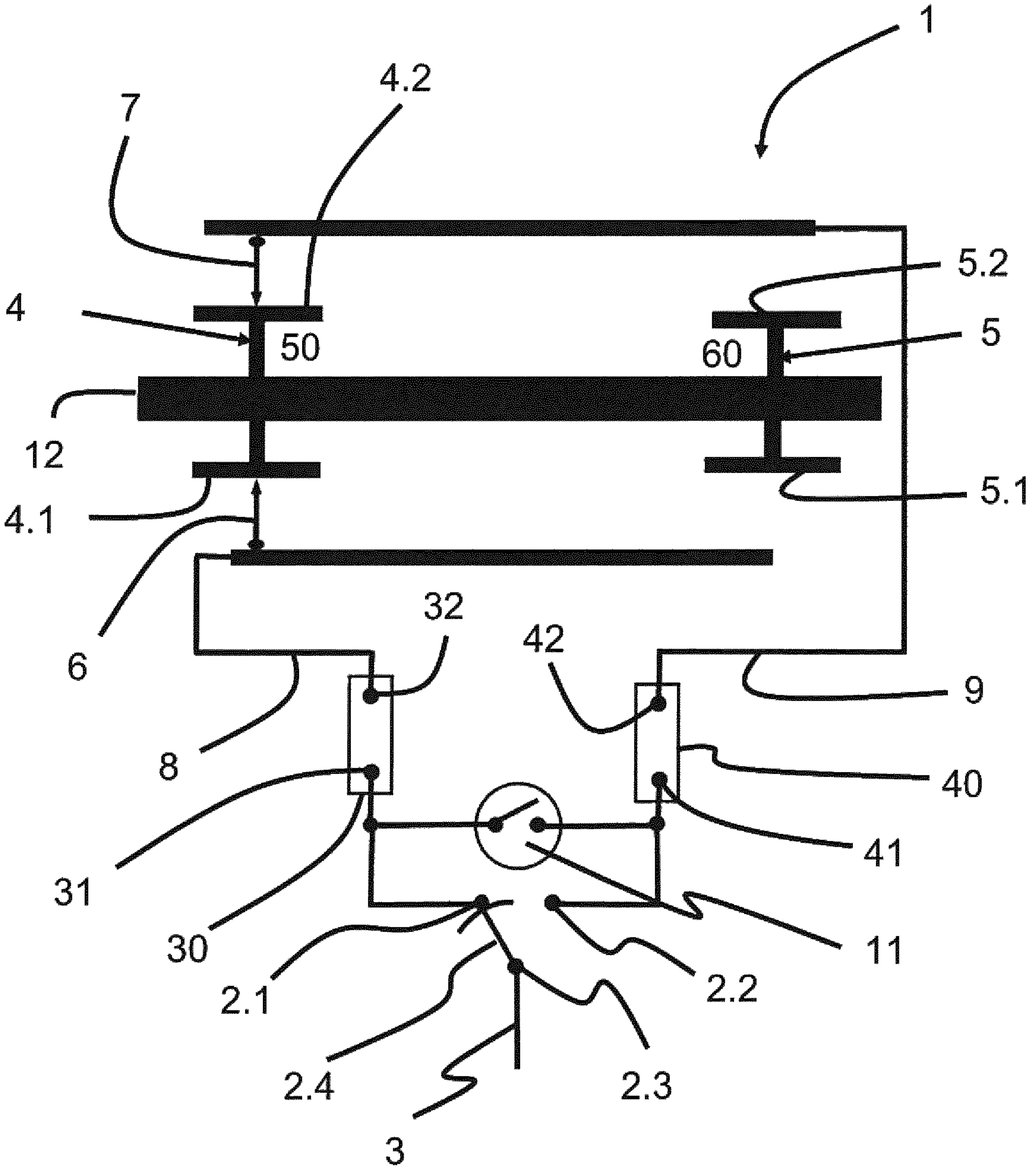
FIG. 1 shows an on-load tap-changer with a first connection and a second connection.

Aspects of the present disclosure provide an on-load tap-changer, which has a simple and compact structure, ensures safe operation, and can be used in a variable and versatile manner.

An aspect of the present disclosure provides an on-load tap-changer, comprising a main path with a first connection, an auxiliary path with a second connection, wherein:

one module can be connected to each of the first and second connections.

Each module can be configured in any desired fashion, for example as a transition resistor, as a reactor, as a bridge, or as a combination of a transition resistor, reactor, or bridge.

Because different elements in the form of modules can be inserted/connected or even "left out" in the main path and the auxiliary path, in which the respective connection is bridged, it becomes possible to provide either an on-load tap-changer using the resistor-type high-speed switching principle or an on-load tap-changer using the reactor-type switching principle from the on-load tap changer. When a module which is designed as a transition resistor is connected to the main path and the connection in the auxiliary path is bridged by a module with a bridge, a resistor-type high-speed tap-changer is created. When each module, which is configured as a reactor, is connected to the auxiliary path and the main path, a reactor-type tap-changer is produced. The fundamental structural configuration of the on-load tap-changer per se is thus not changed. Selectors, contacts, etc. remain the same at all times. As required, lastly different modules are connected and the type of on-load tap-changer thus selected. The rigid basic structure thus remains flexible and can be used in a versatile way. Even the activation time of the two types of tap-changers is the same and does not have to be adapted. Usually, on-load tap-changers using the resistor-type high-speed switching principle are activated quickly and on-load tap-changers using the reactor-type switching principle are activated slowly.

The connections at the main path and auxiliary path can be configured in different fashions. They can be configured as terminals, plug contacts, stranded wires, or any other desired electrically conductive contact point. They only have to enable the main path and the auxiliary path to be equipped with different modules.

The modules can be configured in any desired manner and can, for example, be fastened directly on the on-load tap-changer itself or be arranged in the vicinity of the on-load tap-changer. Preferably, a module which is configured as a bridge or transition resistor is attached directly on the on-load tap-changer itself. A module which is configured as a reactor can be arranged in the immediate vicinity of the tap-changing transformer, for example below or next to the on-load tap-changer.

The modules can be configured in any desired fashion and have, for example, connections which are designed as terminals, plug contacts, stranded wires, or any other desired electrically conductive contact point. The connections of the modules correspond to the connections in the auxiliary path and in the main path.

In a preferred embodiment:

the on-load tap-changer can be designed as a reactor-type tap-changer if a module which is designed as a reactor is connected in each case to the first connection and the second connection, and the on-load tap-changer can be designed as a resistor-type high-speed tap-changer if a module which is designed as a bridge is connected to the first connection and a module which is designed as a transition resistor is connected to the second connection.

In a preferred embodiment:

when the on-load tap-changer is activated, the main path and the auxiliary path are connected to fixed contacts of different winding taps of a tap winding.

The activation usually takes place directly via a motor-drive unit or a manual drive. However, it is also possible for a spring energy accumulator, which is charged by the motor-drive unit or the manual drive, to be arranged between the on-load tap-changer and the motor-drive unit or manual drive, and the spring energy accumulator then activates the on-load tap-changer.

In a preferred embodiment:

if, in the main path and the auxiliary path, the respective module is a reactor, the on-load tap-changer assumes a stationary position after it has been activated in which the main path and the auxiliary path make contact with the same fixed contacts or different fixed contacts of winding taps; and if the module is present in the main path as a bridge and the module is present in the auxiliary path as a transition resistor, the on-load tap-changer assumes a stationary position after it has been activated in which the main path and the auxiliary path make contact with the same fixed contacts of winding taps.

The activation of the on-load tap-changer takes place in a few seconds, alternatively in one second, preferably in less than 500 milliseconds, particularly preferably in 300 milliseconds, if the on-load tap-changer is designed as a resistor-type high-speed tap-changer. Before and after a transfer operation, the on-load tap-changer assumes a stationary position in which a tap-changing transformer is then operated. This stationary position is assumed before the beginning of a transfer operation and also after the completion of a transfer operation. In the case of an on-load tap-changer which is configured as a resistor-type high-speed tap-changer, the first moving contact and the second moving contact are situated on the same fixed contact in the stationary position. After the transfer operation has been carried out, the two moving contacts are situated on the adjacent winding tap, i.e. also on the same fixed contact. The switching element and the transfer contact are also activated during the transfer operation.

The activation of the on-load tap-changer takes place in a few seconds, alternatively in one second, preferably in less than 500 milliseconds, particularly preferably in 300 milliseconds, if the on-load tap-changer is designed as a reactor-type tap-changer. A stationary position is possible here in which the first moving contact is in the closed position on a first fixed contact and the second moving contact is in the closed position on another adjacent fixed contact. The advanced retard switch then makes contact with all the transfer contacts. This position is the so-called "bridging position".

The stationary position refers to the state or the situation of the on-load tap-changer in which no activation of individual elements takes place. The stationary position is also an operating position in which no regulation takes place and the regulating transformer or the transformer is in regulating mode. The stationary position is furthermore an operating position in which a winding tap of the regulating transformer is connected and a continuous current flows via the main path.

In a preferred embodiment:

the on-load tap-changer has at least two moving contacts.

The moving contacts can be designed in any designed fashion as required, for example as contacts which can be moved linearly or in rotation within one or different planes. The moving contacts can be designed as selector contacts of a tap selector.

The on-load tap-changer can be configured in any desired manner and have at least one bridging switch.

The bridging switch can here be designed as a rotary switch in which the movable center contact is rotated, or as a pull switch in which the movable center contact is pulled or pushed.

The center contact advantageously does not make contact with the second transfer contact in the first position and does not make contact with the first transfer contact in the second position.

In a preferred embodiment:

the advanced retard switch comprises a movable first center contact which is connected to the third transfer contact and a movable second center contact which is connected to the third transfer contact;

the first and/or second center contact makes contact with the first transfer contact in the first position, the second and/or the first center contact makes contact with the second transfer contact in the second position, and the first center contact makes contact with the first transfer contact, and the second center contact the second transfer contact, in the bridging position.

The advanced retard switch with two center contacts reaches the bridging position by one of the center contacts making contact with the first transfer contact and the other center contact making contact with the second transfer contact. At least one of the center contacts must make contact with the first or the second transfer contact in a first or second position.

The center contacts advantageously do not make contact with the second transfer contact in the first position and do not make contact with the first transfer contact in the second position.

The on-load tap-changer can be configured in any desired manner and have at least one switching element.

In an advantageous embodiment the switching element is designed as a vacuum interrupter, oil switching path, or semiconductor switching element which can be, for example, an IGBT or thyristor.

In a preferred embodiment each fixed contact has at least two contact surfaces;

in the case of each fixed contact, the first contact surface is associated with the first moving contact and the second contact surface is associated with the second moving contact.

The contact surfaces can be designed in any desired fashion and, for example, lie within a common plane or within different planes and/or project in the same direction or in different directions and/or be designed with one or multiple parts.

In a preferred embodiment the third transfer contact is or can be connected to a take-off lead.

Illustrated schematically in FIG. 1 is electrical equipment which forms by way of example a regulating transformer or a transformer and which comprises by way of example a tap winding 12 and an on-load tap-changer 1 designed according to a preferred embodiment for uninterrupted switching between winding taps n, n+1 of the tap winding 12. This on-load tap-changer 1 has an advanced retard switch 2 designed according to a first embodiment with a first, second, and third transfer contact 2.1, 2.2, 2.3 and a movable center contact 2.4, which is connected to a take-off lead 3 of the equipment. This advanced retard switch 2 is designed as a bridging switch 2. The advanced retard switch 2 makes contact with the first switching contact 2.1 in a first position, the second switching contact 2.2 in a second position, and both switching contacts 2.1, 2.2 in a bridging position. It thus connects the first and third switching contact 2.1, 2.3 in the first position, the second and third switching contact 2.2, 2.3 in the second position, and the first, second, and third switching contact 2.1, 2.2, 2.3 in the bridging position.

Two of the fixed contacts 4, 5 are connected to an associated winding tap 50, 60. The number of fixed contacts here depends on the number of winding taps. Each fixed contact 4, 5 has at least two contact surfaces 4.1, 4.2, 5.1, 5.2. The on-load tap-changer 1 furthermore has at least two moving contacts 6, 7, each of which can selectively make contact with at least one of the fixed contacts 4, 5. The first contact surface 4.1, 5.1 is thus at all times associated with the first moving contact 6 and the second contact surface 4.2, 5.2 is at all times associated with the second moving contact 7.

A main path 8 connects the first moving contact 6 to the first transfer contact 2.1. An auxiliary path 9 path the second moving contact 7 to the second transfer contact 2.2. The main path 8 has a first connection 30 and the auxiliary path 9 a second connection 40. Depending on requirements, in particular whether an on-load tap-changer using the resistor-type high-speed switching principle or a reactor-type switching principle is needed, it is possible to equip the on-load tap-changer 1 accordingly via the connections 30, 40.

Thus, in the case of the configuration of the on-load tap-changer as a resistor-type high-speed tap-changer, the connection 30 in the main path 8 is bridged by means of a module 10 which is designed as a bridge 22 and a transition resistor 20 is connected in the auxiliary path 9 via the connection 40. In the case of a configuration as a reactor-type tap-changer, a module 10 with a reactor 21 is connected to the connections 30, 40 in each case in the main path 8 and in the auxiliary path 9.

As illustrated in FIG. 1, the first connection 30 disconnects the main path 8 between the first moving contact 6 and before the connection to the switching element 11. The second connection 40 disconnects the auxiliary path 9 between the second moving contact 7 and before the connection to the switching element 11. The main path 8 and the auxiliary path 9 can be connected to each other via the switching element 11. The switching element 11 is preferably designed as a vacuum interrupter, semiconductor switch element, or a simple oil contact.

Figure 2:
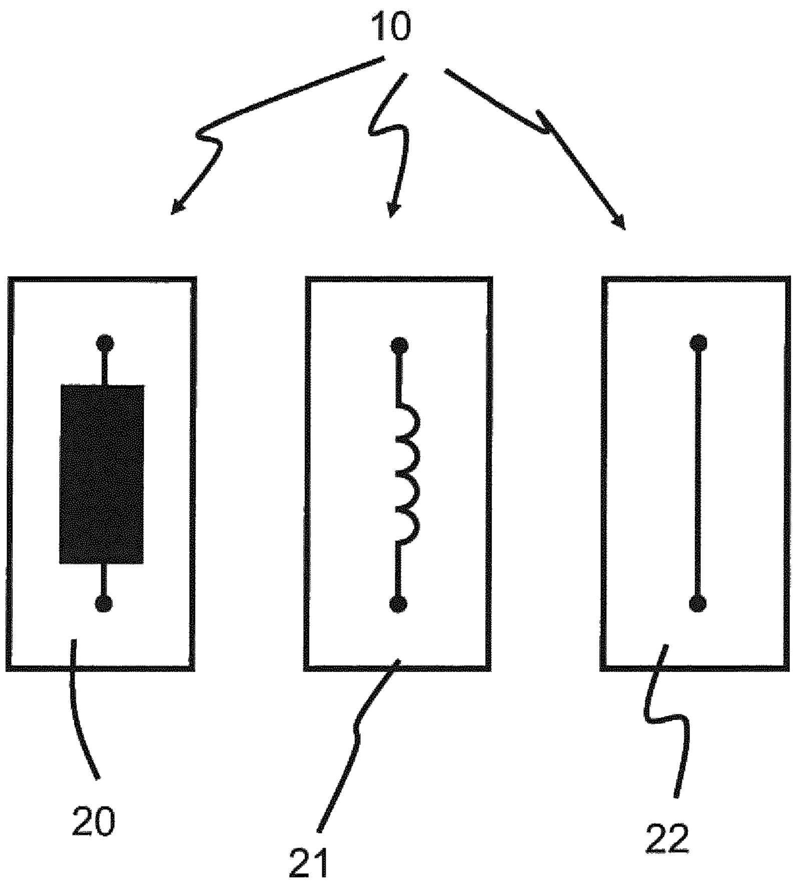
FIG. 2 shows three different modules for the first and the second connection of the on-load tap-changer.

FIG. 2 shows a schematic illustration of three modules 10 which can be connected to the first or second connection 30, 40. The module 10 can be configured as a transition resistor 20, reactor 21, or bridge 22.

Figure 3:
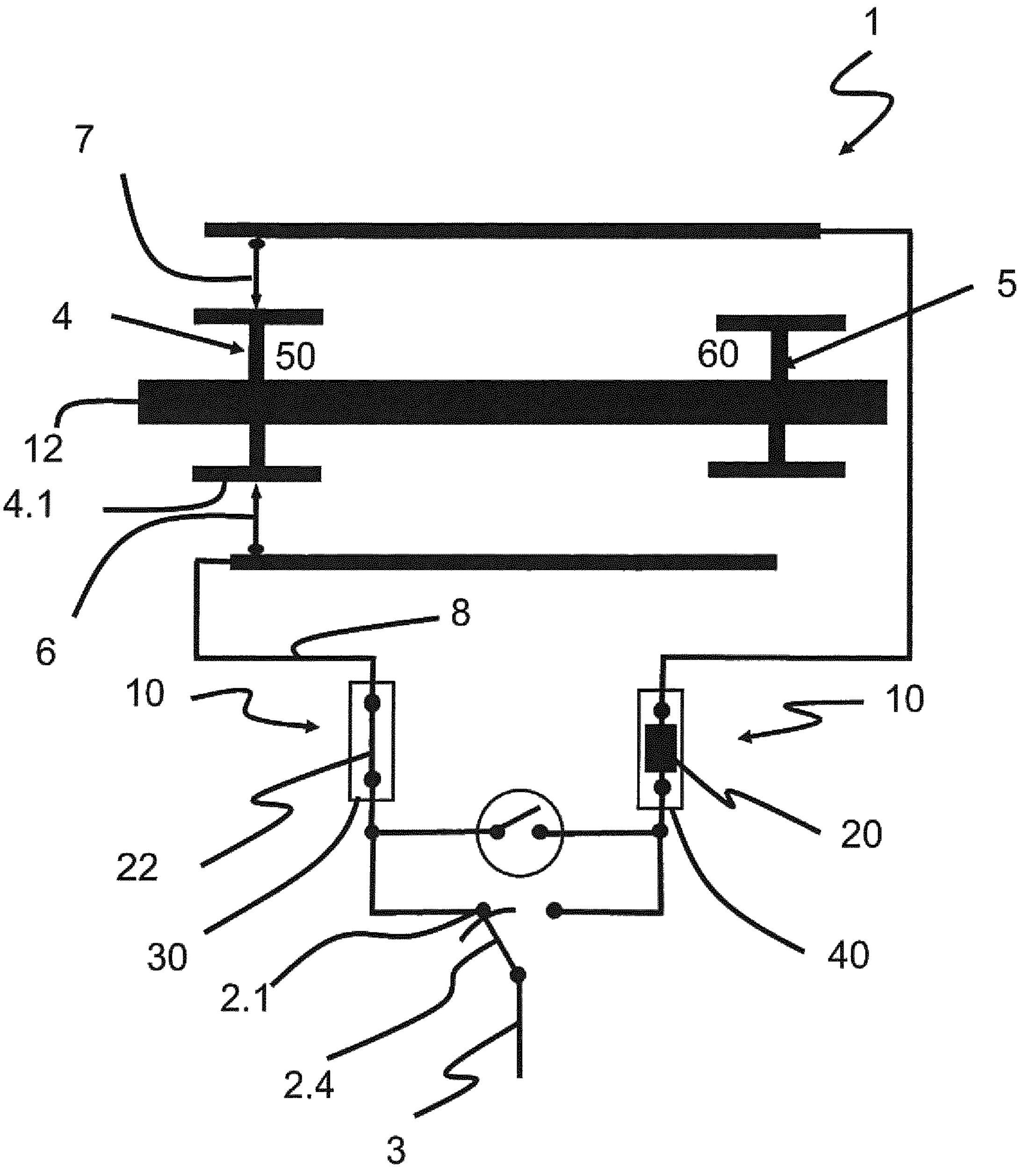
FIG. 3 shows an on-load tap-changer using the resistor-type high-speed switching principle.

FIG. 3 shows the on-load tap-changer 1 in the variant as a resistor-type high-speed tap-changer. A module 10 which is designed as a bridge 22 is here inserted in the first connection and a module 10 which is designed as a transition resistor 20 is inserted in the second connection 40. In this embodiment of the on-load tap-changer 1, the stationary position is provided only when the two moving contacts 6, 7 and hence the main path 8 and the auxiliary path 9 at all times make contact with the same fixed contact 4, 5 and hence the same winding tap 60. The on-load tap changer 1 is activated via a drive 13. Essentially the moving contacts 6, 7 are thus moved from a first winding tap 50 to a second adjacent winding tap 60 in a fixed sequence using the switching element 11 and the advanced retard switch 2. The activation generally takes place within a few seconds or even quicker. In the stationary position shown here, which is an operating position, a continuous current flows from the tap winding 12 via the fixed contact 4, in particular the first contact surface 4.1, the first moving contact 6, the main path 8 with the first connection 30, via the advanced retard switch 2, in particular the first transfer contact 2.1, the first movable center contact 2.4, the third transfer contact 2.3, to the take-off lead 3.

Figure 4:
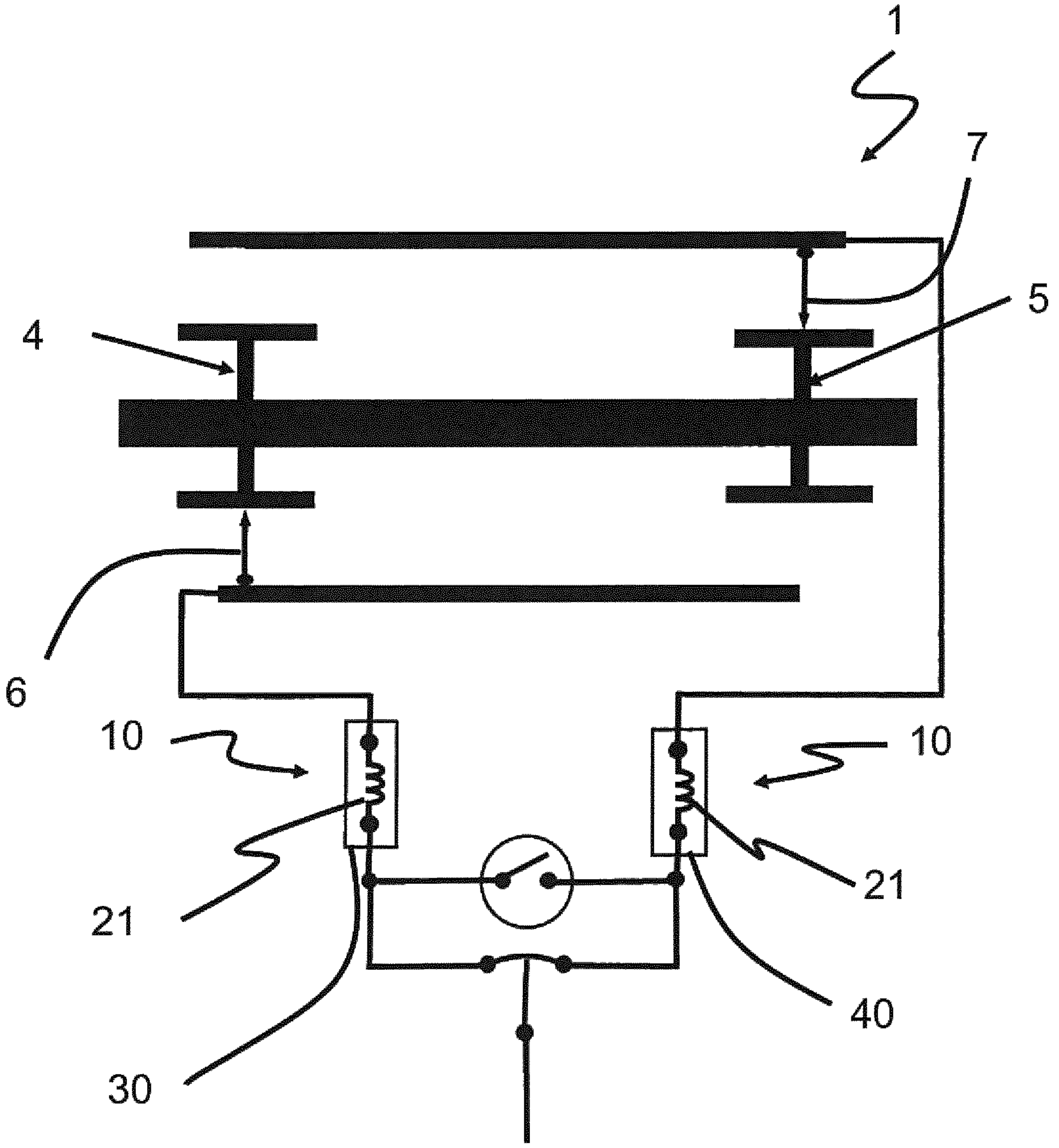
FIG. 4 shows an on-load tap-changer using the reactor-type switching principle.
Figure 5:
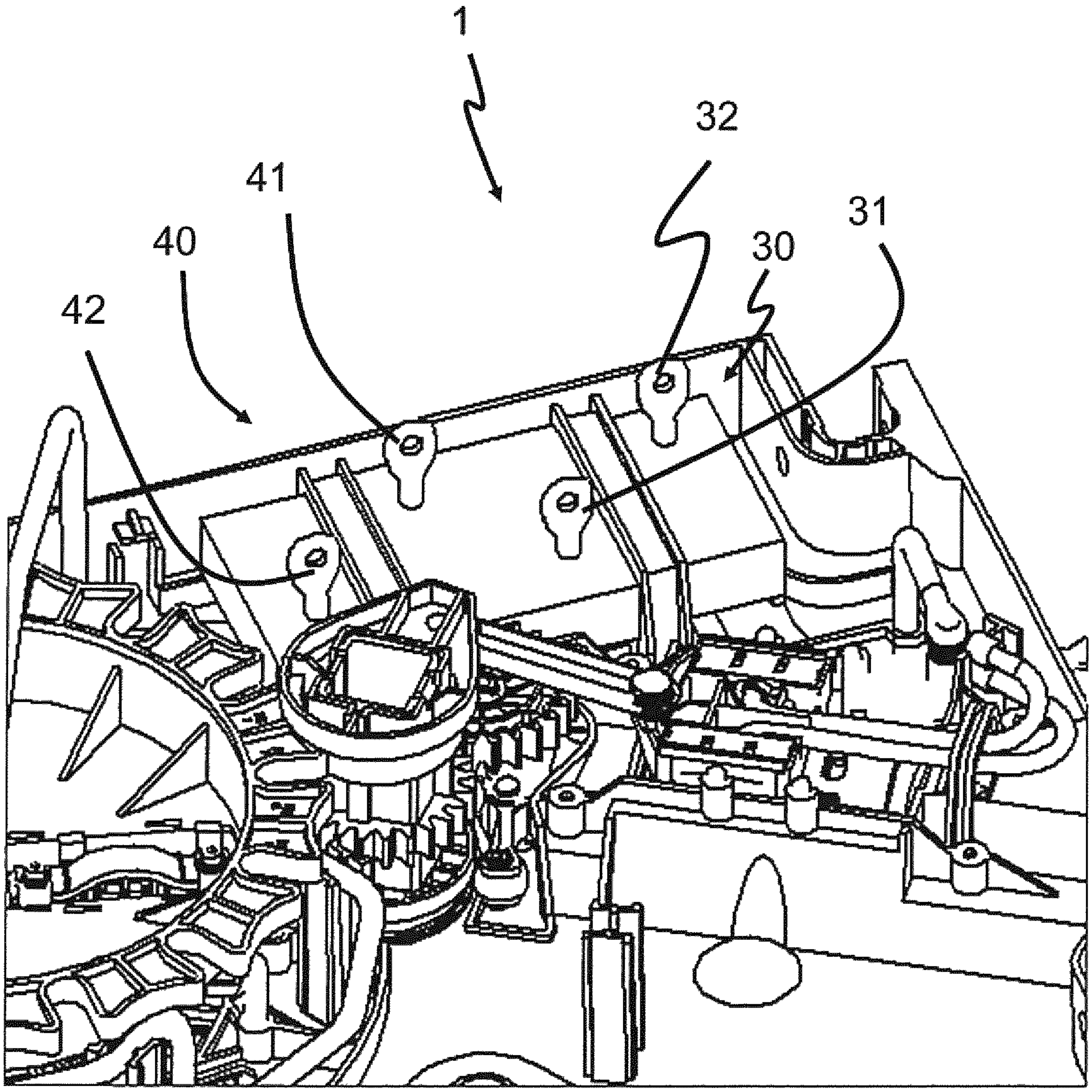
FIG. 5 shows an on-load tap-changer with a first and a second connection.

FIG. 4 shows the on-load tap-changer 1 in the variant as a reactor-type tap-changer. A module 10 which is designed as a reactor 21 is here connected in each case to the first connection 30 and to the second connection. In this embodiment of the on-load tap-changer 1, a stationary position is provided when the two moving contacts 6, 7 and hence the main path 8 and the auxiliary path 9 make contact with the same fixed contact 4, 5 and hence the same winding tap 50, 60. A further stationary position of this embodiment is provided when the two moving contacts 6, 7 and hence the main path 8 and the auxiliary path 9 make contact with different fixed contacts 4, 5 and hence different winding taps 50, 60. The on-load tap changer 13 is also activated here via the drive 13. Essentially the moving contacts 6, 7 are thus moved from a first winding tap 50 to a second adjacent winding tap 60 using the switching element 11 and the advanced retard switch 2 which are activated in a fixed sequence. The difference from the embodiment in FIG. 3 is that the switching process can be stopped when the moving contacts 6, 7 make contact with different fixed contacts 4, 5 and the advanced retard switch 2 has assumed a bridging position. The activation or the switching process generally takes place within a few seconds or even quicker. FIG. 5 shows the connections 30, 40 of the on-load tap-changer 1. The first connection 30 has a first terminal 31 and a second terminal 32. The second connection 40 has a third terminal 41 and a fourth terminal 42. The modules 10 and thus a transition resistor 20, bridge 22, or reactor 21 can be connected to the terminals 31, 32, 41, 42. The modules 10 have corresponding terminals which correspond to the first, second, third, and fourth terminal 31, 32, 41, 42.

Figure 6:
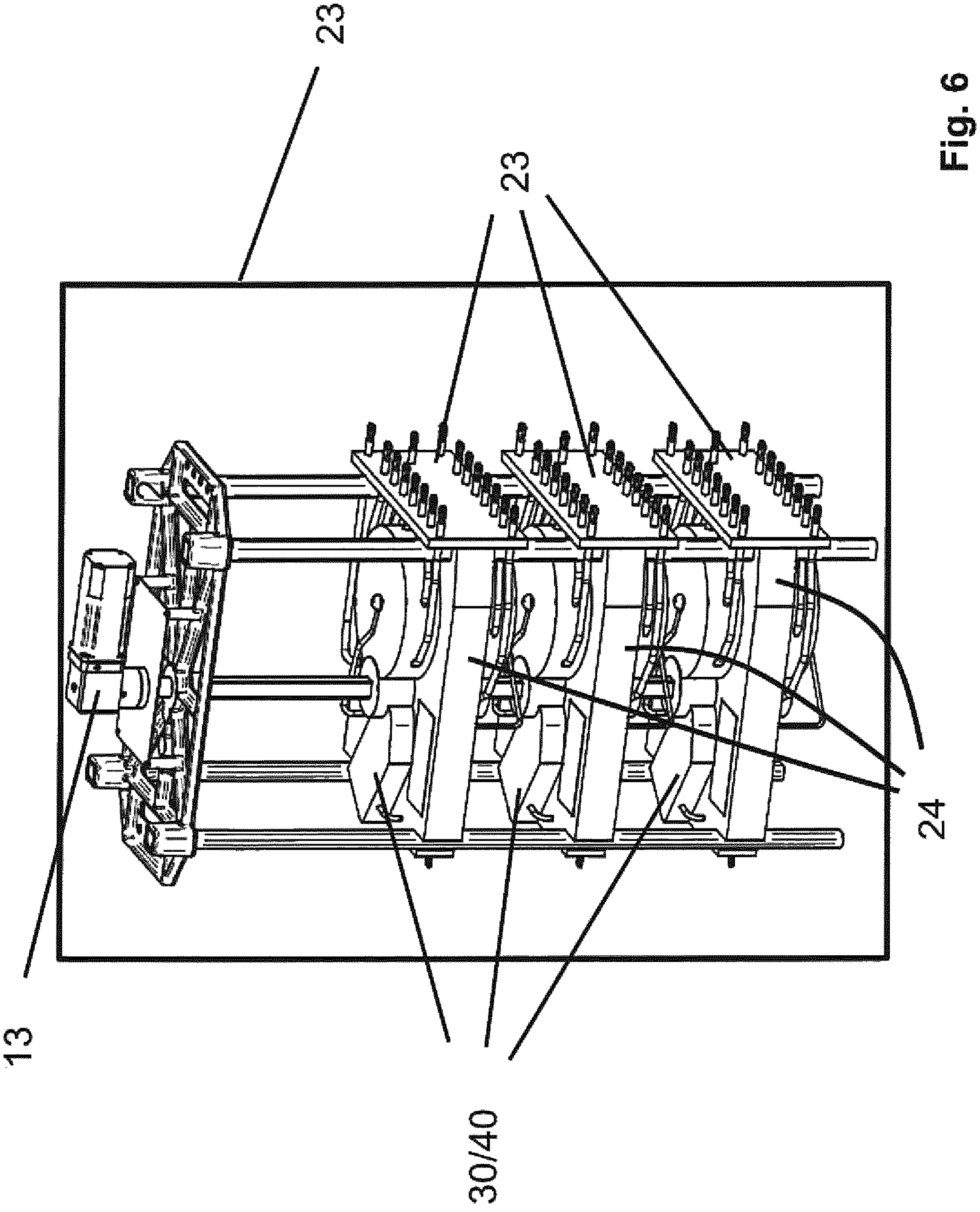
FIG. 6 shows an on-load tap-changer.

FIG. 6 shows a three-phase on-load tap-changer 1 with three switching modules 23 in a regulating transformer 70. Each switching module 23 comprises a plate 24. Arranged on each plate 24 are a selector, with the first and the second moving contact 6, 7, a change-over selector, and an on-load tap-changer, with in each case two connections 30, 40 for the modules 10, the main path 8, the auxiliary path 9, the advanced retard switch 2, and the switching element 11. The drive 13 is designed as a motor-drive unit and is arranged on the upper side of the on-load tap-changer. The drive 13 activates a drive shaft by means of which the individual components of the switching modules 23 are activated.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 on-load tap-changer
2 advanced retard switch
2.1 first transfer contact
2.2 second transfer contact
2.3 third transfer contact
2.4 first movable center contact
2.5 second movable center contact
3 take-off lead
4 fixed contacts
4.1 first contact surface
4.2 second contact surface
5 fixed contacts
5.1 first contact surface
5.2 second contact surface
6 first moving contact
7 second moving contact
8 main path
9 auxiliary path
10 module
11 switching element
12 tap winding
13 drive
20 transition resistor
21 reactor
22 bridge
23 switching module
24 plate
30 first connection
31 first terminal
32 second terminal
40 second connection
41 third terminal
42 fourth terminal
60 winding tap
70 regulating transformer

The invention claimed is:

1. An on-load tap-changer, the on-load tap-changer comprising:

a main path with a first connection; and an auxiliary path with a second connection, wherein the first connection is configured to be modularly connected to a first module, wherein the second connection is configured to be modularly connect to a second module, wherein the first module is configured as a reactor or a bridge, wherein the second module is configured as a second reactor or a switching resistor, and wherein the on-load tap-changer is selectably configurable as one from the group of a reactor-type tap-changer and a resistor-type high-speed tap changer, the on-load tap-changer being configured as the reactor-type tap-changer based on having the first module configured as the reactor connected to the first connection and the second module configured as the second reactor connected to the second connection, and the on-load tap-changer being configured as the resistor type high-speed tap-changer based on having the first module configured as the bridge connected to the first connection and the second module configured as the transition resistor connected to the second connection.

2. The on-load tap-changer as claimed in claim 1, wherein when the on-load tap-changer is activated, the main path and the auxiliary path are configured to be connected to fixed contacts of different winding taps of a tap winding.

3. The on-load tap-changer as claimed in claim 1, wherein the on-load tap-changer is selectively configurable such that:

based upon the on-load tap-changer being configured as the reactor switch, the on-load tap-changer is configured to assume a stationary position after the on-load tap-changer has been activated in which the main path and the auxiliary path make contact with same fixed contacts or different fixed contacts of winding taps of a tap winding of a transformer; and based upon the on-load tap-changer being configured as the resistor type high-speed tap-changer, the on-load tap-changer is configured to assume the stationary position after the on-load tap-changer has been activated in which the main path and the auxiliary path make contact with the same fixed contacts of the winding taps.

4. The on-load tap-changer as claimed in claim 1, wherein:

the on-load tap-changer is configured to not be activated in a stationary position; and the on-load tap-changer is configured such that no regulation takes place and a regulating transformer is in regulating mode.

5. The on-load tap-changer as claimed in claim 1, further comprising a drive that is configured to activate the on-load tap-changer.

6. The on-load tap-changer as claimed in claim 5, wherein the drive is configured to move the on-load tap-changer into different stationary positions.

7. The on-load tap-changer as claimed in claim 5, wherein the drive is configured to activate the on-load tap-changer in less than 500 milliseconds based upon the on-load tap-changer being configured as the resistor-type high-speed tap-changer or as the reactor-type tap-changer.

8. A regulating transformer comprising:

the on-load tap changer as claimed in claim 1.

9. A method of selectively configuring the on-load tap-changer as claimed in claim 1, the method comprising:

determining to configure the on-load tap changer as either the resistor-type high-speed tap-changer or the reactor-type tap-changer;

based on the determination, selecting the first module such that the first module is the reactor or the bridge, selecting the second module such that the second module is the second reactor or the transition resistor; and configuring the on-load tap-changer as either the resistor-type high-speed tap-changer or the reactor-type tap-changer by connecting the selected first module to the first connection and connecting the selected second module to the second connection.

10. The method of claim 9, wherein the determining to configure the on-load tap changer as either the resistor-type high-speed tap-changer or the reactor-type tap-changer comprises determining to configure the on-load tap changer as the resistor-type high-speed tap-changer, wherein the selecting of the first module comprises selecting the first module as the bridge, wherein the selecting of the second module comprises selecting the second module as the transition resistor; and wherein the configuring of the on-load tap-changer as either the resistor-type high-speed tap-changer or the reactor-type tap-changer comprises configuring the on-load tap-changer as the resistor-type high-speed tap-changer by connecting the selected first module to the first connection and connecting the selected second module to the second connection.

11. The method of claim 9, wherein the determining to configure the on-load tap changer as either the resistor-type high-speed tap-changer or the reactor-type tap-changer comprises determining to configure the on-load tap changer as the reactor-type tap-changer, wherein the selecting of the first module comprises selecting the first module as the reactor, wherein the selecting of the second module comprises selecting the second module as the second reactor; and wherein the configuring of the on-load tap-changer as either the resistor-type high-speed tap-changer or the reactor-type tap-changer comprises configuring the on-load tap-changer as the reactor-type tap-changer by connecting the selected first module to the first connection and connecting the selected second module to the second connection.

12. An on-load tap-changer, the on-load tap-changer comprising:

a main path with a first connection; and an auxiliary path with a second connection, wherein one module is configured be connected to each of the first and second connections wherein:

the on-load tap-changer is configured to not be activated in a stationary position; and the on-load tap-changer is configured such that no regulation takes place and a regulating transformer is in regulating mode.

* * * * *